United States Patent [19]

Dijon et al.

[11] Patent Number: 5,157,524
[45] Date of Patent: Oct. 20, 1992

[54] APPARATUS AND METHOD FOR DISPLAYING LEVELS OF GREYS ON A MATRIX TYPE DISPLAY SCREEN

[75] Inventors: Jean Dijon, Champagnier; Thierry Leroux, Fontaine, both of France

[73] Assignee: Commissariat a l'Energie Atomique, Paris, France

[21] Appl. No.: 411,394

[22] Filed: Sep. 22, 1989

[30] Foreign Application Priority Data

Sep. 30, 1988 [FR] France .................. 88 12810

[51] Int. Cl.[5] .............................................. G02F 1/13
[52] U.S. Cl. ........................... 359/54; 359/62; 359/87; 340/784; 340/783
[58] Field of Search ............ 350/333; 359/54; 340/784 BL, 783

[56] References Cited

U.S. PATENT DOCUMENTS

| 4,233,602 | 11/1980 | Hamura | 340/752 |
| 4,531,160 | 7/1985 | Ehn | 340/793 |
| 4,559,535 | 12/1985 | Watkins et al. | 340/793 |
| 4,661,809 | 4/1987 | Anderson et al. | 340/793 |
| 4,712,877 | 12/1987 | Okada et al. | 340/793 |
| 4,791,417 | 12/1988 | Bobak | 348/793 |
| 4,850,675 | 7/1989 | Hatanaka et al. | 340/793 |
| 4,976,515 | 12/1990 | Hartmann | 350/333 |
| 4,986,637 | 1/1991 | Yamaguchi | 350/333 |
| 4,995,703 | 2/1991 | Noguchi | 350/333 |

FOREIGN PATENT DOCUMENTS

| 219479 | 4/1986 | European Pat. Off. |
| 193728 | 9/1986 | European Pat. Off. |
| 240010 | 10/1987 | European Pat. Off. |
| 60-192920 | 1/1985 | Japan |
| 60-95426 | 5/1985 | Japan |
| 60-188924 | 9/1985 | Japan |
| 61-262724 | 11/1986 | Japan |
| 62-70815 | 1/1987 | Japan |
| 62-244018 | 10/1987 | Japan |
| 62-244019 | 10/1987 | Japan |
| 2164776 | 3/1986 | United Kingdom |

Primary Examiner—Andrew J. James
Assistant Examiner—Daniel N. Russell
Attorney, Agent, or Firm—Nilles & Nilles

[57] ABSTRACT

Method for displaying levels of greys on a matrix display screen, such as a chiral smectic phase ferroelectric liquid crystals screen, comprising a cell containing the crystal provided on its walls with two matrix systems of right angle i line conductors and j column conductors, the various pixels of the image being defined by the superimposed crossings of these conductors, wherein each pixel is embodied with the aid of p independent sub-pixels each having its own transmission coefficient, each of which is able to display several states of different basic greys, including black and white, and, on each of the p sub-pixels, one of the states of the preceding greys is displayed by taking account, for each of these, of its own transmission so as to obtain for each pixel via the visual addition of the contributions of each sub-pixel the display of a suitable shade of grey closest to the analog value indicated by the video write signal.

13 Claims, 4 Drawing Sheets

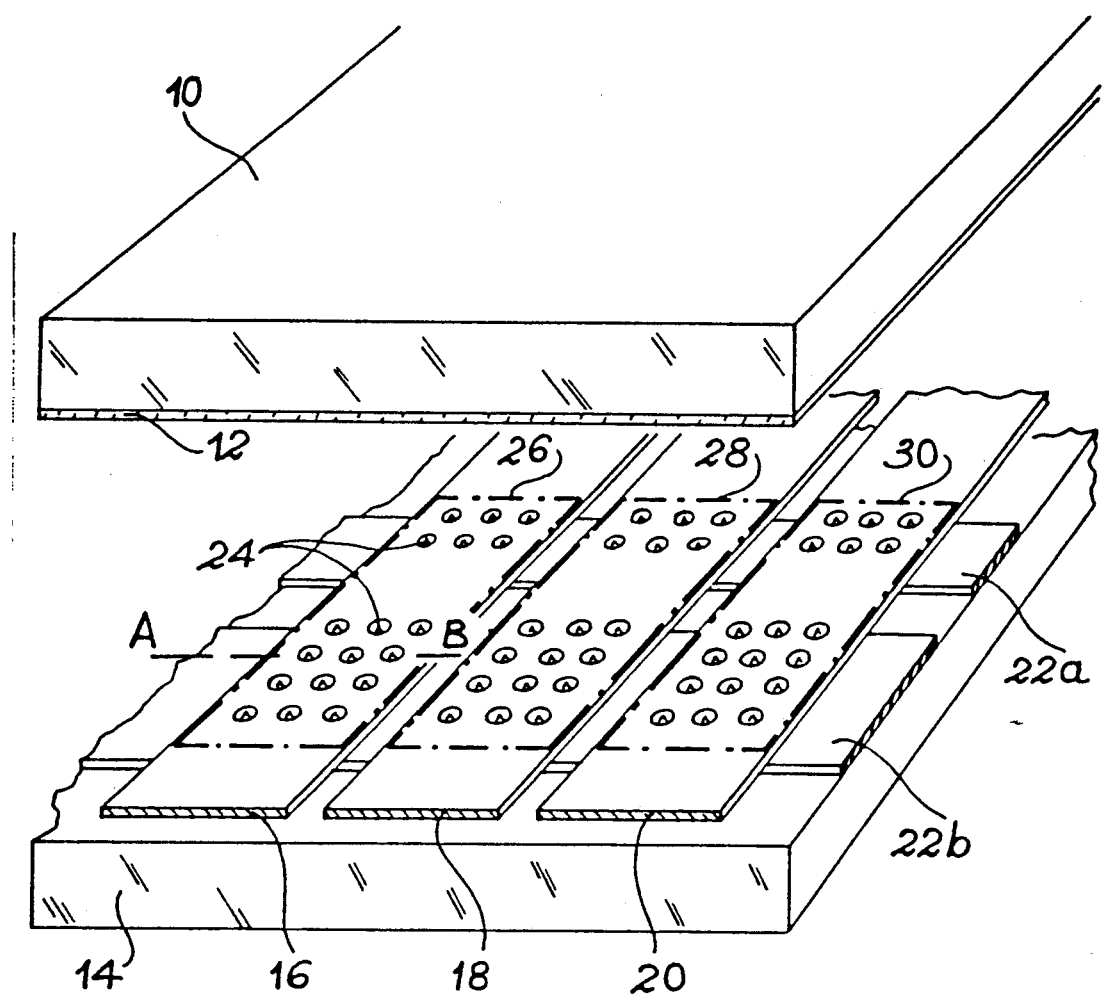
FIG. 8A
FIG. 8B
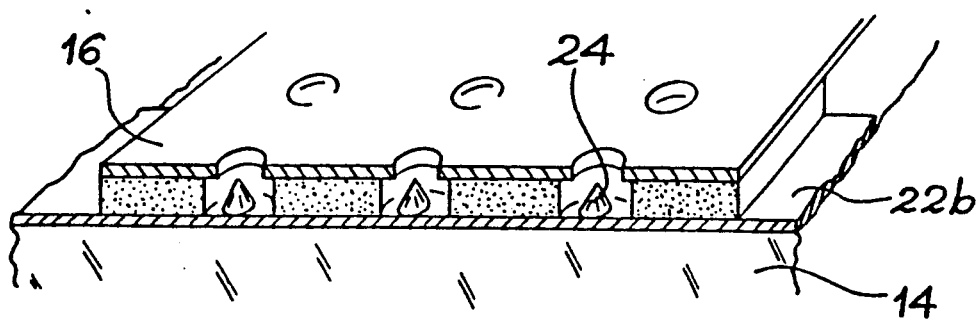

APPARATUS AND METHOD FOR DISPLAYING LEVELS OF GREYS ON A MATRIX TYPE DISPLAY SCREEN

FIELD OF THE INVENTION

The object of the present invention is to provide a method for displaying levels of greys on a matrix screen in which the image displayed is constituted by the juxtaposition of various pixels distributed along the lines and columns of the matrix and addressed by a set of line conductors and column conductors.

BACKGROUND OF THE INVENTION

In particular, the method is applicable to chiral smectic phase ferroelectric liquid crystal screens functioning by transmission, electroluminescent screens functioning by emission and more particularly to micropoint screens.

For the sake of convenience, the following description is made by referring principally to the case of ferroelectric liquid crystal display screens, but this of course is not restrictive and in particular persons of ordinary skill in this field could easily readily transpose the means thus described to any other type of screen, such as, for example, micropoint emitting screens.

For the same reasons, there now follows a description of the black or white states of each pixel by reference to what effectively is present with screens that function by transmission. In the case of screens that function by emission, as with micropoint photoluminescent screens, the description of the black and white states of each pixel is by reference, respectively, to the maximum emission state and the absence of any emission state of a specific pixel.

The invention is particularly applicable to optoelectronic techniques, the field of television and the binary (or analog) display of complex images, as well as to the display of alphanumeric characters. Firstly, of course it concerns display in black and white, but also the display of color images, as shall be seen subsequently.

Although the invention is applicable to any type of tilted smectic chiral liquid crystals it refers more particularly to chiral smectic phase liquid crystals.

As regards the details of the present invention, consideration shall be given to the constitution of ferroelectric liquid crystal display screens recognised by persons of ordinary skill, said screens being described in detail in the documents EP-A-0092181 and EP-A-0032362. The main characteristics of these shall not be described here in detail, except to mention that a liquid crystal display screen generally comprises two crossed polarizers between which is disposed a cell containing the crystal and provided on its walls with two matrix systems of right angle i line conductors and j column conductors, the various pixels of the image being defined by the crossings of these superimposed conductors. It is fundamental for an understanding of the present invention, that the ferroelectric liquid crystals used until now mostly have a bistable state allowing for a switching from black to white (or vice versa) under the control of the electric field applied at each point of the crystal from the potential difference V established by the line conductor and column conductor referring to this pixel. The switching from one state to another is effective when the product Vt of the voltage V applied at each point by the time t during which it is applied exceeds a threshold value $(Vt)_{threshold}$.

The problem which the present invention resolves is of writing a certain number of shades or levels of grey on a black and white image, it being understood, as has just been mentioned, that the cells of the ferroelectric liquid crystals display only makes it possible to embody shades of grey from a mixture of opaque (black) surfaces or totally transmitting (white) surfaces.

The problem of inscribing by means of such a screen a certain number of intermediate shades of grey between black and white is one already investigated by researchers and this point as regards this field has been fully discussed firstly by the document entitled CONFERENCE RECORDS OF THE 1985 INTERNATIONAL DISPLAY RESEARCH CONFERENCE, San Diego, Calif., Oct. 15-17, 1985, pages 215 to 220, and secondly the document EP-A-0 219 479 by the same authors.

The first of these methods consists of embodying a certain number of states, each of which has its own switching threshold. This is embodied, either by using ferroelectric liquid crystals in several stable states, a technique which is just starting to be employed, or by embodying on a pixel several ranges of different thicknesses. In the event, those technologies using solutions of this type are extremely difficult to implement.

A further solution, also specified by the preceding documents, consists of collectively associating several adjacent sub-pixels with a different surface area. Thus, by combining the transmission coefficient proportional to the surface of each of them with black or white display, it is possible to obtain a higher number of levels of grey. By way of example, if each pixel is subdivided into four sub-pixels whose surfaces are in the ratios 1, 2, 4 and 8, a binary display base is thus constituted which, via a combination of the preceding surfaces and the two black and white states, makes it possible to display 16 different levels of grey. The possible number of the levels of grey to be thus obtained is $2^n$ if each pixel comprises n sub-pixels. The result obtained is therefore relatively modest if one considers the resultant increase in complexity of the screen and the fact that a significantly higher number of levels of grey is required so as to be able to display a sufficient number of shades evenly distributed between black and white.

A third solution resides in what can be called here the creation of a temporal grey scale in which the greys are obtained by separating each frame into at least two parts, namely one part during which a black state is written and another part during which a white state is written. Of course, the implementation of this solution produces a resultant grey owing to the retinal persistance of the information picked up by the eye. Unfortunately, this method requires screens addressed by extremely fast control circuits if it is desired to embody an acceptable number of greys. In fact, the number n of the sub-frames theoretically required to display $2^m$ levels of grey is such that $m<n<2$ with, in practice, n barely differing from $2^m$. The preceding equality shows that, if it is desired to display via this method 16 levels of grey, that is if, m is equal to 4 with a video signal rate equal to that of television applications, namely 64 microseonds per line, it is only possible to have available 4 microseconds so as to display a line which is at the limit of feasibility.

SUMMARY OF THE INVENTION

This method for displaying levels of greys on a chiral smectic phase ferroelectric liquid crystals screen comprising a cell containing the crystal and associated with linear polarization means and provided on its walls with two matrix systems of right angle i line conductors and j column conductors, the various pixels of the image being defined by the superimposed crossings of these conductors, the switching from black to white (or vice versa) of each pixel being controlled by the electric field E applied to this pixel from the potential difference V established during a time t between the line conductor and the column conductor relating to this pixel, this switching being effective as soon as the product Vt exceeds a threshold value $(Vt)_{threshold}$ according to the geometrical and dielectrical parameters of the cell, the writing of the screen taking place consecutively for each frame or image line by line, the line i being open to writing by a line signal applied during the time when the write signals corresponding to the black or white state of each pixel of this line are simultaneously transmitted by the set of j column conductors of the matrix, is characterized in that each pixel is embodied with the aid of p independent sub-pixels, each having its own transmission coefficient and able to display several states of different basic greys, black and white included, and in that on each of the p sub-pixels one of the states of the preceding greys is displayed by taking account, for each of them, of its own transmission so as to obtain for each pixel via the visual addition of the contributions of each sub-pixel the display of the shade of a suitable grey closest to the value indicated by the video write signal.

The originality of the method of the invention results, as can be seen, from the fact that the advantages of an independent pixel divided into p sub-pixels each having its own transmission coefficient are combined with the fact that each sub-pixel is able to display a certain number of predetermined different basic greys. Then, by combining the contributions of each sub-pixel by its grey state and its own transmission coefficient for each pixel by calling upon the possibilities of a computer, it is possible to obtain the shade of grey closest to the ideal analog value indicated by the video write signal. By acting on the various transmission coefficients of each sub-pixel and on the scale of the basic grey states which each of these may assume, it is thus possible to calculate in each particular case the combinations of these two elements, which shall make it possible to draw closer to the analog value of the video signal.

According to the invention, two means are able to be used so as to allocate each sub-pixel with its own transmission coefficient.

The first of these methods consists of allocating this transmission coefficient proper to each sub-pixel by selecting its surface in the pixel in which it forms a part, the p sub-pixels of a specific pixel then being able to have different surfaces or areas.

The second method able to be used for this purpose consists of adjusting the transmission coefficient of a sub-pixel to the desired value by obscuring at least one part of its surface. This technique is especially preferably when, in order to embody a sub-pixel having a relatively small transmission coefficient, it would be embodied with a small surface, which would not be obtained with certainty by current engraving techniques.

It is then much easier to start with a larger surface which is partially obscured.

According to an improved mode for implementing the preceding method, each sub-pixel is obtained by cutting the line and/or column electrode conductors thus forming addressing sub-lines and/or sub-columns, the surfaces of each of these p sub-pixels constituting, from the smallest taken as a unit, a geometric ratio progression (n+1), each of the p sub-pixels being able to display (n+1) levels of equidistant basic greys, black and white included, from which one of the $(n+1)^P$ states of grey (black and white included) is constructed able to be displayed on each pixel of the screen.

By seeking in effect to optimize the method explained earlier as regards its most extensive applications, the applicant has found that it was particularly important to constitute the sub-pixels by surfaces whose values, from the smallest one taken as a unit, are in geometric progression with the n+1 level and of conceiving the addressing system so that it is able to display on each of the p sub-pixels (n+1) levels of equidistant basic greys, black and white included, which, via the association of the transmissions proper to each surface and grey level pixel, allows for the embodiment of $(n+1)^P$ states of grey on each pixel of the screen.

At the same time, it is also important to embody each sub-pixel by cutting the line and/or column electrode conductors, that is in fact from addressing sub-lines and/or sub-columns.

According to the invention, the displaying of (n+1) levels of the basic greys of each sub-pixel is effected by the successive display on this sub-pixel of one of the two basic white or black states during n sub-frames, so that the resultant visual sensation at the end of each frame is precisely that of one of the (n+1) preceding sought-after levels.

Thus, it can be seen that it is at the level of each sub-pixel and during each of the n sub-frames that one of the two basic black or white states is written, thus making it possible to obtain at will on each sub-pixel one of the (n+1) levels of the equidistant basic greys required to implement the method.

According to one variant of the preceding method, the displaying of (n+1) levels of basic greys of each sub-pixel is embodied by giving each of them n ranges of a suitable thickness conferring on each range a black and white switching threshold $(Vt)_{threshold}$ different from that of its adjacent ones, the state of grey of each sub-pixel then being according to the potential difference V applied to the crystal of this sub-pixel.

Finally, according to a further variant, the displaying of these same (n+1) levels of basic greys for each sub-pixel is embodied by using for the cell a liquid crystal with n stable switching states.

According to one improvement of the method of the invention, flickering, resulting from the displaying of a zone of greys, is avoided. To this effect, the sequences of the sub-frames displaying all the sub-pixels of this zone in the white state in a sub-frame of order k and in the black state in the sub-frame of order (k+1) are replaced by two sub-frames spatially and temporally distributing the information by writing each pixel to the shade of the sought-for grey during two sub-frames by mixing the white and black sub-pixels so that a white sub-pixel during the first sub-frame is black during the second sub-frame, and vice versa.

This functioning of the method is particularly advantageous when a zone of uniform grey with a certain range and persisting over a period of time is displayed on the screen. In fact, if no particular measure were taken, such a situation would result in having, for all the sub-pixels of the pixels of this zone, series of black state and white state sub-frames, which objectively produces the ideal conditions for the appearance of the flickering phenomenon due to the fact that, during a given sub-frame, the eye is able to perceive the spontaneous weakening of the black state and that the latter is turning towards grey owing to the spatial and temporal extent of the phenomenon. The write mode resulting from the preceding characteristic of the method makes it possible to reduce this risk by providing for all the sub-pixels of this zone an average constant transmission as regards the time and space involved, which definitely supresses flickering.

The object of the present invention is also to provide a liquid crystal screen for the displaying of levels of greys according to the preceding methods whose structures are defined according to three particular modes.

According to the first embodiment of such a screen, the sub-pixels of each pixel are addressed by a single line (or column) and several sub-columns (or sub-lines); in other words, the division of each pixel into sub-pixels results from the division of one of the line or column electrode conductors.

According to a second mode of implementation, the p sub-pixels of each pixel result from the simultaneous division of the lines into sub-lines and the columns into sub-columns, each pixel then being addressed by x sub-lines and y sub-columns with xy=p.

Finally, according to a third mode, frequently advantageous for implementing the invention, the liquid crystal screen is embodied by the fact that one of the two types of conductors (sub-lines or sub-columns) is periodically width-modulated so as to embody by crossing with the conductors of the other type (columns or lines) the various surfaces of the p sub-pixels of each pixel.

BRIEF DESCRIPTION OF THE DRAWINGS

The invention shall be more readily understood from a reading of the following description of several examples for implementing the method for displaying levels of greys on a ferroelectric liquid crystal screen, accompanied by the annexed FIGS. 1 to 8b in which:

FIGS. 8a and 8b diagrammatically illustrate an example for applying the invention to a micropoint display screen structure.

DETAILED DESCRIPTION OF THE PREFERRED EMBODIMENTS

Before describing several examples for implementing the invention, there now follows an explanation, for a particular case, of the method recommended for the embodiment of $(n+1)$ levels of basic greys on each sub-pixel.

As indicated previously, one preferred embodiment of the method of the invention lowers to the level of the sub-pixel and sub-frame the displaying of two single possible basic states for a bistable ferroelectric liquid crystal, namely black and white. According to the invention, each frame for displaying the time T (about 20 milliseconds in television video signals) is divided into n sub-frames, each having a period $T' = T/n$. It is during each sub-frame that each sub-pixel is able to be displayed in black or white and that the equidistant levels of greys are thus constituted by mixing on each sub-pixel n display states, each of which is either white or black. The persistence or retention of retinal impressions ensures that the eye perceives at the end of the frame a grey shade resulting from the mixture of the white and black states successively displayed during this frame on the sub-pixel in question.

Because during each sub-frame, each sub-pixel is either white or black, it can be readily understood that by combining n binary black or white states, it is thus possible to obtain $(n+1)$ levels of equidistant greys, that is those whose shades are in arithmetical progression between the black total, which corresponds to the transmission 0, and the white total, which corresponds to the transmission 1.

The following table I, which relates to an example for displaying a sub-pixel during three sub-frames (n=3), shows the transmission values of four levels of greys $(n+1=4)$ obtained by this method and makes it possible to understand the principle of associating the black and white states on a given sub-pixel so as to obtain the $(n+1)$ states of the equidistant and basic grey states sought-for.

TABLE I

| 3 sub-frames | 4 resultant shades |
|---|---|
| N N N | 0 |
| N N B | $\frac{1}{3}$ |
| N B N |  |
| B N N |  |
| N B B | $\frac{2}{3}$ |
| B N B |  |
| B B N |  |
| B B B | 1 |

Table I (wherein N stands for black and B stands for white) represents on each occasion the three possible temporal sequences for the states $\frac{1}{3}$ and $\frac{2}{3}$, it being understood that in reality only one of them is satisfied, since, at least in theory, they are equivalent as regards the human eye. Also, four shades $(n+1=4)$ of grey are obtained whose shade 0, namely black, and the shade 1, namely white, are in arithmetical progression with the ration $\frac{1}{3}$ between 0 and 1, namely, equidistant in color or shade.

By generalizing the preceding example, it can be seen that, with the aid of n sub-frames during which the white states and black states are displayed on each sub-pixel, it is possible to display on each of the latter $(n+1)$ equidistant basic grey shades.

Figure 1:
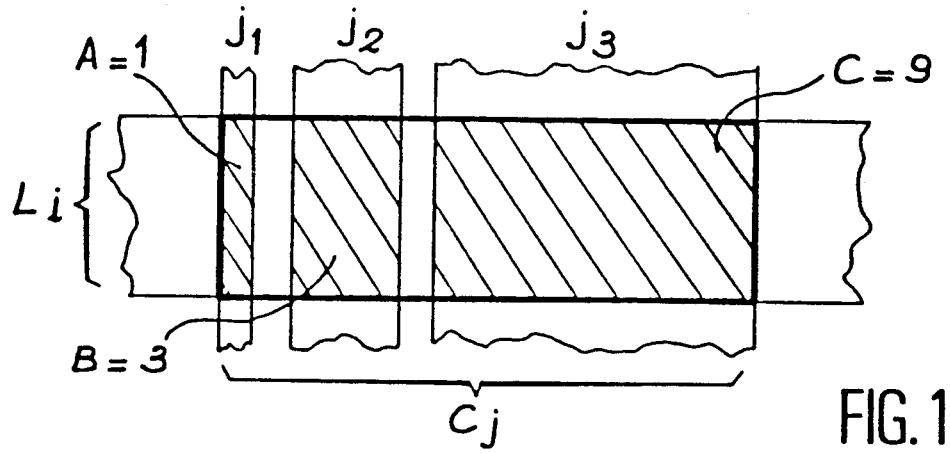
FIG. 1 shows one example for implementing the invention on a pixel divided into three sub-pixels.

With reference now to FIG. 1, there now follows a description of a mode for organizing a pixel comprising three sub-pixels A, B and C whose surfaces are in geometrical progression with the ratio 3. In other words, if A is taken as a unitary surface, the surface of B=3 units and the surface of C=9 units. In the example of FIG. 1, the three sub-pixels A, B and C are embodied from a given line i and from three sub-columns j1, j2 and j3. If the pixel thus constituted is implemented in a method with two sub-frames (n=2), the invention shows that it is thus possible to obtain $(n+1)^P=3^3=27$ basic states of greys. This result can be verified as follows.

As each of the sub-pixels A, B and C may only be displayed twice (once during each sub-frame), each frame is only able to assume the three basic grey states, 0, ½ and 1. If the participation of each of these sub-pixels A, B and C is now weighted according to its transmission surface, it is clear that its contribution to the actual weight of the grey displayed on the pixel (A+B+C) during a frame corresponds to the figures indicated on the following table II.

TABLE II

| A | B | C |
|---|---|---|
| 0 | 0 | 0 |
| ½ | 3/2 | 9/2 |
| 1 | 3 | 9 |

By mixing three-by-three (p=3) the transmissions of table II, it is easy to see the continuation of the states 0, 1, 2, 3, ..., 26 is thus constituted clearly corresponding to the 27 pronounced equidistant basic grey states, black and white included. This is shown by the table III shown below in which the selected states are indicated for each of the sub-pixels A, B, c so as to employ the greys 0, 1, 2, 3, ..., 26 clearly corresponding to 27 equidistant states. In practice, it is clear that the choice of the various display sequences is effected by the computer according to the result required to be displayed for each pixel.

TABLE III

| Grey numbers | Pixel Transmission Arbitrary units | Sub-pixels Transmission | | |
|---|---|---|---|---|
| | | A | B | C |
| 0 | 0 | 0 | 0 | 0 |
| 1 | ½ | ½ | 0 | 0 |
| 2 | 1 | 1 | 0 | 0 |
| 3 | 3/2 | 0 | 3/2 | 0 |
| 4 | 2 | ½ | 3/2 | 0 |
| 5 | 5/2 | 1 | 3/2 | 0 |
| 6 | 3 | 0 | 3 | 0 |
| , | , | , | , | , |
| , | , | , | , | , |
| 25 | 25/2 | ½ | 3 | 9 |
| 26 | 13 | 1 | 3 | 9 |

Figure 2:
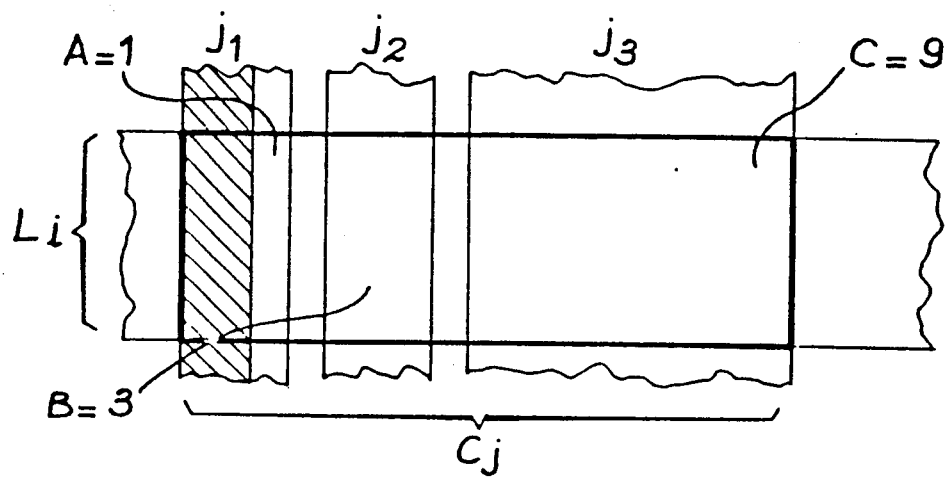
FIG. 2 shows a pixel of the same constitution in which one of the sub-pixels comprises an obscured zone.

With reference now to FIG. 2, there now follows a description of a pixel constitution comparable to that of FIG. 1, namely one comprising 3 sub-pixels with a respective transmission surface 1, 3 and 9 constituted from a given line i and 3 sub-columns j1, j2 and j3 of the column j. In the particular example of FIG. 2, the pixel with a unitary transmission surface has been embodied from a sub-column j1 of the same width as the sub-column j2, but which has been obscured, for example, by means of a plating of a metal, such as chromium, with a thickness of 1500 A over two thirds of its surface. This means for implementing the method is sometimes simpler when it is difficult to obtain the unitary surface, which is required to be extremely small, solely by means of known engraving methods.

Figure 3:
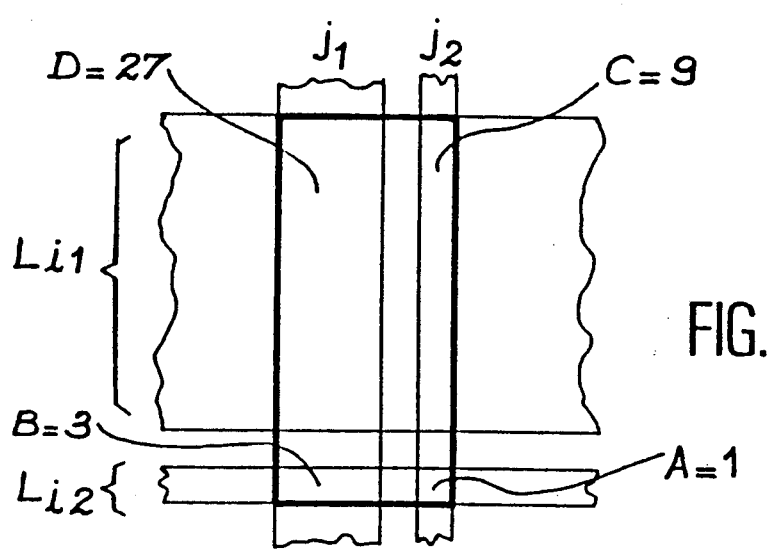
FIG. 3 shows a further embodiment example with a pixel divided into 4 sub-pixels.

With reference now to FIG. 3, there now follows a particularly advantageous example for implementing the invention in which each pixel is divided into 4 sub-pixels A, B, C, D whose surfaces are in geometrical progression with the ratio 3 and accordingly with a respective value of 1, 3, 9 and 27. Such a pixel can be easily embodied by dividing each line into two sub-lines i1 and i2 and each column into two sub-columns j1 and j2, as shown by the figure. If a two sub-frame display is used, then p=4, n=2 (n+1)=3 is obtained and the number of greys able to be displayed on each pixel is $(n+1)^P=3^4=81$. This number is sufficient so as to obtain a pallet of greys allowing for an already shaded display of a video image with a screen embodiment relatively easy to obtain by engraving. In the preceding example, the 81 levels of distinct greys respectively correspond to the coefficients 0, 1, 2, 3, ..., 80, followed by the states in which the state 0 denotes white and the state 80 denotes black.

It is important to note that, for screen structures in which each pixel is cut into a number of sub-pixels p which is a prime number, it is impossible to effect the addressing of these p sub-pixels by means of a system of sub-lines and sub-columns, but it is nevertheless possible to embody the screen, for example, as follows. The implementation of the method of the invention results in embodying a matrix of (p−1) sub-pixels per pixel (since p−1) in this case is not the first one) by associating the pth sub-pixel of a given pixel with its homolog of the immediately adjacent pixel.

Figure 4:
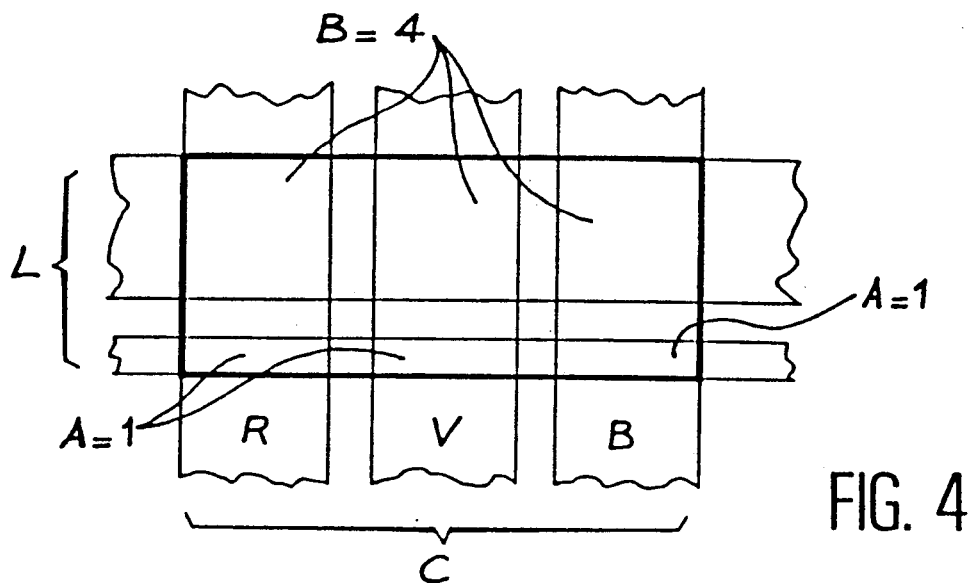
FIG. 4 shows one possible example of color display by using the method of the invention.
Figure 5:
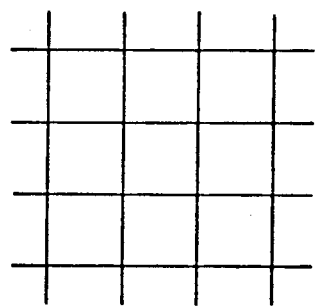
FIGS. 5a, 5b, 6a and 6b show the problems of flickering during the writing of a uniform grey over a large surface, as well as the solution offered by the invention.
Figure 5:
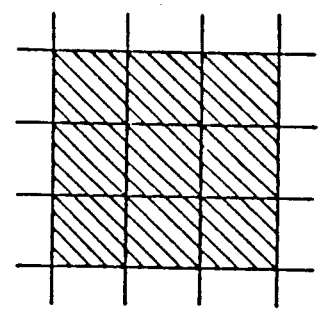

With reference to FIG. 4, there now follows an explanation as to how it is possible to embody the display of a color image by means of the method of the invention. A color display may usually and conventionally be embodied by superimposing on a matrix of black, white and grey pixels a matrix of filters with the colors red, green and blue respectively. FIG. 4 relates to the particular case of three adjacent pixels each divided into two sub-pixels (p=2) with the surface ration 1 and 4 (n+1=4). If filters with the colors red, green and blue are superimposed by allocating each of them to one of the three preceding pixels, a unit is obtained able to display $(n+1)^P=4^2=16$ levels of greys for each of the three basic colors red, green and blue. In the preceding example, a colored pixel consequently requires the association of three pixels from the corresponding black and white screen.

With reference to FIGS. 5a, 5b, 6a and 6b, there now follows an examination of the problems of flickering which may interfere with the sound functioning of a display screen using the method of the invention when, which is frequently the case with the transmissions of images, a relatively large surface of the screen is required to display and retain for a certain time a uniform grey zone. In fact in this case, certain sub-pixels of the pixels of the zone involved are brought to display the completely white state (FIG. 5a) during a sub-frame of the order k and the completely black state (FIG. 5b) during the next sub-frame of the order k+1. Accordingly, if the surface in question has a certain dimension, the observer notices a flickering at half the sub-frame frequency.

Figure 6:
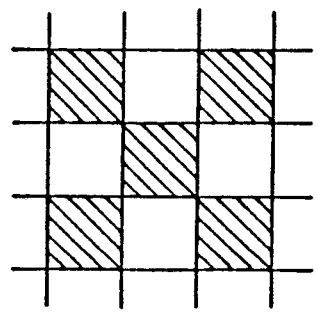
Figure 6:
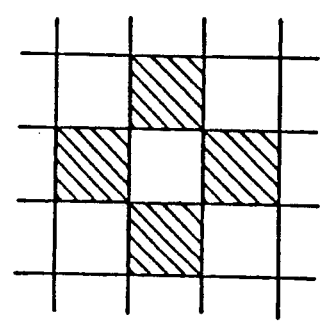

In order to overcome this difficulty, each time a white/black or black/white sequence needs to be applied to a sub-pixel during two sub-frames in a series of n frames, the information of the two preceding sub-frames is spatially and temporally distributed, as is clearly visible on FIGS. 6a and 6b, by writing each pixel with the sought-for shade of grey by mixing the white sub-pixels and the black sub-pixels so that one white sub-pixel during the first sub-frame becomes black during the second sub-frame and vice versa. This way for implementing the method of the invention, which can be easily embodied by the computer for controlling addressing, cause the flickering to disappear whilst ensuring constant mean temporal and spatial transmission in the zone in question. If there then exists any residual flickering, this occurs at the frame frequency 1/T.

Figure 7:
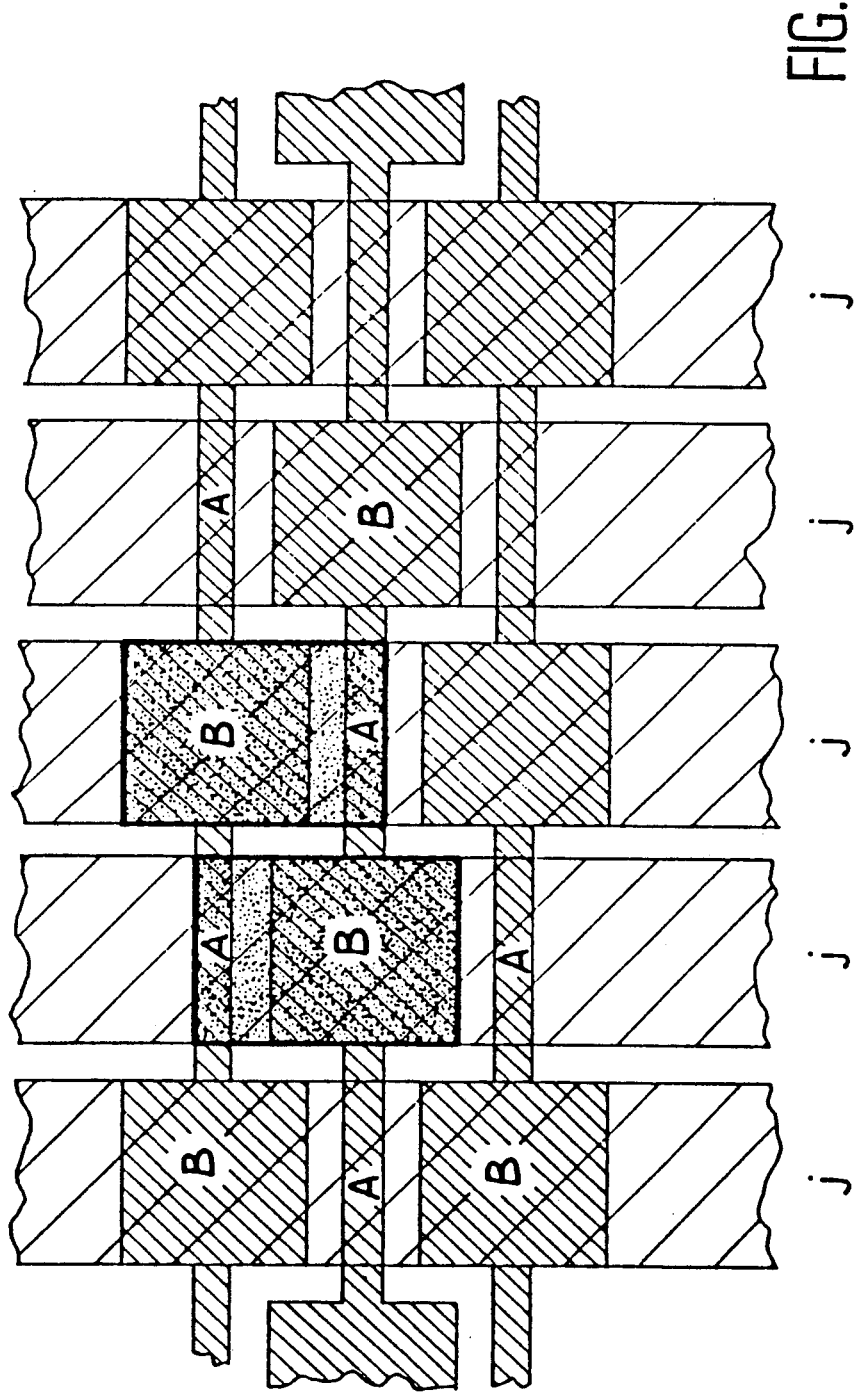
FIG. 7 illustrates a particular embodiment of a screen with two sub-pixels per pixel.

FIG. 7 describes a particularly advantageous embodiment of a liquid crystals display screen for implementing the method of the invention. In this screen, each pixel is divided into two sub-pixels whose surfaces A and B are in the ratio 1 to 5, the two sub-pixels having the width of each of the columns j of the screen and a length periodocally modulated according to dimensions varying from 1 to 5 and embodied by line conductors, which themselves are accordingly width-modulated. Thus as can be seen in this example, the structure of the sub-pixels is obtained by crossing between the columns of constant width and the lines of variable length once out of two at the level of the crossings with the columns.

It is also possible to apply the invention to micropoint fluorescent screens. In this case, FIGS. 8a and 8b represent each pixel being cut into p independent sub-pixels, each having its own emission coefficient and being able to display several states of different greys.

FIG. 8a shows between two substrates, namely the "upper" one 10 bearing the phosphorus layer 12 and the "lower" one 14 bearing the line conductors 16, 18 and 20 and the column conductors 22, the micropoints 24 disposed according to a matrix network.

FIG. 8a shows on a larger scale the known structure of such a screen on a partial section of FIG. 8a along a vertical plane A-B.

In the example of FIG. 8a, the column conductor 22 is composed of two sub-conductors 22a and 22b of different widths, which results in each of the pixels 26, 28 and 30 being divided into two sub-pixels with different surfaces. The various levels of grey on the sub-pixels required to implement the method of the invention may be obtained by varying the potential difference applied at their terminals, as well as its period of application.

What is claimed is:

1. Method for displaying levels of greys on a matrix screen comprising a juxtaposition of pixels addressed by a set of line conductors and column conductors, wherein each pixel consists of p sub-pixels having different surface areas, each sub-pixel being able to display several states selected from the group consisting of different basic greys, black and white, and on each of the p sub-pixels preceding states of greys are able to be displayed so as to obtain for each pixel as a result of visual adding of the contributions of each sub-pixel, taking into account the surface area of each sub-pixel, the displaying of a chosen grey shade, each pixel define by the crossing of line and column conductors and each sub-pixel being formed by the cutting of at least one of the line and column conductors thus forming addressing sub-lines and addressing sub-columns, respectively, the surface areas of each of these sub-pixels constituting, from the smallest one taken as a unit, a geometrical progression of the ratio $(n+1)$, each of the sub-pixels being able to display during a time frame $(n+1)$ equidistantly shaded basic levels of greys, black and white, from which one of the $(n+1)^p$ levels of greys is constructed on each pixel of the screen, p and n representing integers $\leq 2$ and $\leq 2$, respectively.

2. Method for displaying levels of greys on a chiral smectic phase ferroelectric liquid crystal matrix screen comprising a cell containing the crystal and placed between two linear polarizers and provided on its walls with two matrix systems of right angle i line conductors and j column conductors, the various pixels of an image being defined by the superimposed crossings of these line and column conductors, the switching between black and white of each pixel being controlled by an electric field E applied to said pixel from a potential difference V established during a time t of the time frame between the line conductor and the column conductor defining said pixel, said switching being effective as soon as the product Vt exceeds a threshold value $(Vt)_{threshold}$ dependent on the geometrical and dielectrical parameters of said cell, the writing on the screen taking place consecutively for each time frame line by line, a line i being open to writing by a line signal applied during the time during which write signals, corresponding to the black or white state of each pixel of said line i, are transmitted simultaneously by the j column conductors of the matrix system, wherein each pixel comprises independent sub-pixels, each sub-pixel having its own transmission coefficient, each pixel being able to display several states of different basic greys, black and white, and, on each of the sub-pixels, one of the preceding grey states is displayed in accordance with its own transmission coefficient so as to obtain for each pixel, as a result of the visual addition of the contributions of each sub-pixel, the displaying of a chosen grey shade, wherein each sub-pixel is obtained by the cutting of at least one of the line conductors and the column conductors defining a pixel, thus forming addressing sub-lines and addressing sub-columns, respectively, the transmission coefficient of each of these sub-pixels proceeding from the smallest one take as a unit in a geometrical progression of the ratio $(n+1)$, each of the sub-pixels being able to display $(n+1)$ equidistantly shaded basic grey levels, white and black, whereby one of the $(n+1)^p$ states of greys is constructed and able to be displayed on each pixel of the screen, p and n representing integers $\leq 2$ and $\leq 2$, respectively.

3. Method according to claim 2, wherein the actual transmission coefficient of each sub-pixel in a specific pixel is established by defining its surface area so that the sub-pixels of said specific pixel have different surface areas relative to each other.

4. Method according to claim 2, wherein the transmission coefficient of at least one of the sub-pixels of a specific pixel is adjusted to the value of grey required by obscuring part of the surface area of said one sub-pixel.

5. Method according to claim 2, wherein the displaying of the $(n+1)$ levels of the basic greys of each sub-pixel is effected by the successive displaying on each sub-pixel of one of the two basic black and white states during n sub-frames so that the resultant visual sensation at the end of each time frame is precisely the visual sensation of one of the preceding $(n+1)$ levels.

6. Method according to claim 2, wherein the displaying of the $(n+1)$ levels of the basic greys of each sub-pixel is effected by giving each of them n ranges of suitable thickness thereby conferring on each range a black and white switching threshold $Vt_{threshold}$ different from that of its adjacent ranges, the grey state of each sub-pixel then being according to the potential difference V applied to the crystal of this sub-pixel.

7. Method according to claim 2, wherein the displaying of the $(n+1)$ levels of basic greys of each sub-pixel is effected by using for the cell a liquid crystal with n stable switching states.

8. Method according to claim 5, wherein, so as to avoid flicker resulting from the displaying of a grey zone, the sequences of sub-frames displaying all the sub-pixels of the pixels of this zone in the white state in a sub-frame of the order k and in the black state in the sub-frame of the order k+1 are replaced by two sub-frames spatially and temporally distributing the information by writing each pixel at a desired grey shade during two sub-frames by mixing the white sub-pixels and the black sub-pixels so that one white sub-pixel during the first sub-frame is black during the second sub-frame, and vice versa.

9. Liquid crystal screen for the displaying of levels of greys according to claim 2, wherein the sub-pixels of each pixel are addressed by a single conductor and several sub-conductors.

10. Liquid crystal screen for displaying of levels of greys according to claim 2, wherein the p sub-pixels of each pixel are addressed by x conductors and y sub-conductors with $xy=p$.

11. Liquid crystal screen for displaying levels of greys according to claim 2, wherein one of the two types of conductors is periodically width-modulated so as to embody by crossing with the conductors of the other type the various surfaces of p sub-pixels of each pixel.

12. Method for displaying levels of greys according to claim 1 in which the displaying of (n+1) equidistant basic levels of greys of a specific sub-pixel being effected by successive displaying on said specific sub-pixel of one of the white or black states during n successive sub-frames of said time frame so that the visual sensation at the end of each time frame is exactly the visual sensation of one of the (n+1) preceding levels wanted.

13. Method according to claim 1 or 2 wherein $(n+1)^P=81$ levels of grey, black and white.

* * * * *

UNITED STATES PATENT AND TRADEMARK OFFICE
CERTIFICATE OF CORRECTION

PATENT NO. : 5,157,524

DATED : Oct. 20, 1992

INVENTOR(S) : Dijon et al.

It is certified that error appears in the above-identified patent and that said Letters Patent is hereby corrected as shown below:

Claim 1, Col. 9, line 66, "$\leqq 2$ and $\leqq 2$" should read -- $\geqq 2$ and $\geqq 2$ --.

Claim 2, Col. 10, line 40, "$\leqq 2$ and $\leqq 2$" should read -- $\geqq 2$ and $\geqq 2$ --.

Signed and Sealed this

Nineteenth Day of April, 1994

Attest:

BRUCE LEHMAN

*Attesting Officer*  *Commissioner of Patents and Trademarks*